US008111784B1

United States Patent
Ding et al.

(10) Patent No.: US 8,111,784 B1
(45) Date of Patent: Feb. 7, 2012

(54) ON-CHIP DATA SIGNAL EYE MONITORING CIRCUITRY AND METHODS

(75) Inventors: Weiqi Ding, Fremont, CA (US); Mingde Pan, Morgan Hill, CA (US); Wilson Wong, San Francisco, CA (US); Sergey Shumarayev, Los Altos Hills, CA (US); Peng Li, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 860 days.

(21) Appl. No.: 12/082,483

(22) Filed: Apr. 11, 2008

(51) Int. Cl.
*H04L 25/06* (2006.01)

(52) U.S. Cl. ........ 375/317; 375/226; 375/227; 375/316; 375/326; 375/354; 375/360; 375/371; 455/502; 455/516; 714/47; 714/707; 714/752; 327/141

(58) Field of Classification Search .................. 375/354, 375/355, 360, 371, 226, 227, 316, 317, 326; 455/502, 516; 327/141; 714/47, 707, 752
See application file for complete search history.

(56) References Cited

U.S. PATENT DOCUMENTS

| 6,178,213 | B1 * | 1/2001 | McCormack et al. | 375/355 |
| 7,574,146 | B2 * | 8/2009 | Chiang et al. | 398/209 |
| 7,640,463 | B2 * | 12/2009 | Windler et al. | 714/707 |

OTHER PUBLICATIONS

Y. Tomita et al., "A 10-Gb/s Receiver with Series Equalizer and On-Chip ISI Monitor in 0.11-micron CMOS," IEEE Journal of Solid-State Circuits, vol. 40, No. 4, Apr. 2005, pp. 986-993.

* cited by examiner

*Primary Examiner* — Leon Flores
(74) *Attorney, Agent, or Firm* — Ropes & Gray LLP (57) ABSTRACT

Methods and apparatus for gathering information about the eye of a high-speed serial data signal include sampling each bit of a repeating, multi-bit data pattern at several eye slice locations. For any given eye slice location, each bit in the data pattern is compared in voltage to a base line reference signal voltage to establish a reference value for that bit. Then the reference signal voltage is gradually increased while the voltage comparisons are repeated until for some bit a result of the comparing is different than the reference value for that bit. This establishes an upper value for the eye at the eye slice location. The reference signal voltage is then gradually decreased to similarly find a lower value for that eye slice.

19 Claims, 6 Drawing Sheets

ON-CHIP DATA SIGNAL EYE MONITORING CIRCUITRY AND METHODS

BACKGROUND OF THE INVENTION

This invention relates to high-speed serial data communication, and more particularly to methods and apparatus for monitoring the condition of certain aspects of a high-speed serial data signal at any point in circuitry that is handling that signal. The data rate of a typical high-speed serial data signal may be in the range of about 6-10 Gbps (giga-bits per second), although lower and higher data rates are also well known.

In high-speed serial interface ("HSSI") applications, the input signal of a receiver ("RX") integrated circuit device ("chip") is usually attenuated and distorted due to frequency-dependent signal loss across interconnects (e.g., printed circuit board ("PCB") traces from a transmitter ("TX") chip on the PCB to the RX chip on the PCB). This causes inter-symbol interference ("ISI"), which affects the margins for clock and data recovery ("CDR") circuitry on the RX chip. Various RX equalization techniques have been employed to improve the input signal before the CDR circuitry to lower the bit error rate ("BER") of the recovered data.

A common way to evaluate ISI is with a so-called eye diagram of the serial data signal. An eye diagram is a super-positioning of the waveform of multiple data bits in the signal on the time interval of a single bit (a so-called unit interval or UI). An eye diagram visualizes the ISI and other jitter components of the high-speed serial data signal. An oscilloscope can be used to generate an eye diagram (e.g., by connecting probes of the oscilloscope to signal pins on the chip handling the signal).

Users of RX chips that include equalization circuitry would sometimes like to have the ability to observe the eye diagram of a high-speed serial data signal after processing by the equalization circuitry on the chip. Such a feature can have several benefits. First, such an on-chip eye monitor can work like an oscilloscope to probe the internal high-speed nodes that cannot be observed by probing external pins of the chip. Second, the resulting eye diagram shows the RX equalization results, and this information can be used as a basis for making adjustments to the kind(s) and/or amount(s) of equalization being employed. Third, an on-chip eye monitor can help a system engineer analyze, diagnose, and debug HSSI devices without probes and an oscilloscope in the field.

Yasumoto Tomita et al., "A 10-Gbp/s Receiver With Series Equalizer and On-Chip ISI Monitor in 0.11-μm CMOS," IEEE Journal of Solid-State Circuits, Vol. 40, No. 4, April 2005, pp. 986-93, shows use of high-frequency clock signals and switched capacitors to sample and monitor ISI effects. In contrast to what this reference shows, the present invention uses low-frequency clocks to sample a repetitive data pattern and construct an eye diagram. This avoids the need for over-sampling of data signals having data rates like 6-10 Gbps, which over-sampling can be impractical or at least undesirable because of consequent power, area, and complexity considerations.

SUMMARY OF THE INVENTION

In accordance with certain possible aspects of the invention, a method of determining at least part of an eye of a serial data signal that includes a plurality of successive repetitions of a multi-bit data pattern may include controlling the phase of a clock signal to establish an eye slice location for use as a location at which voltage of each bit in the data pattern can be compared to a controllably variable reference signal voltage. The reference signal may then be caused to have a base line voltage (e.g., 0 volts). The voltage of the serial data signal is then compared to the base line reference signal voltage at the eye slice location in each bit in the data pattern to produce a reference value for each of the bits. Thereafter, the reference signal voltage is gradually increased (e.g., from the base line voltage). For each such increase, the voltage of the serial data signal is again compared to the reference signal voltage at the eye slice location in each bit in the data pattern until for some bit a result of the again comparing is different than the reference value for that bit.

In accordance with a further possible aspect of the invention, an indication of the reference signal voltage when the above-mentioned result different than the reference value occurred may be used as an indication of an upper value of the eye at the eye slice location.

In accordance with a still further possible aspect of the invention, after conclusion of the above-mentioned gradually increasing, the reference signal voltage may be gradually decreased (e.g., from the base line voltage). For each such decrease, the voltage of the serial data signal may be compared yet again to the reference signal voltage at the eye slice location in each bit in the data pattern until for some bit a further result of the yet again comparing is different than the reference value for that bit.

In accordance with a yet further possible aspect of the invention, an indication of the reference signal voltage when the above-mentioned further result different than the reference value occurred may be used as an indication of a lower value of the eye at the eye slice location.

In accordance with a still further possible aspect of the invention, the phase of the clock signal may be controlled to establish a plurality of different eye slice locations, and any or all of the operations summarized above may be repeated for each of those eye slice locations.

In accordance with certain other possible aspects of the invention, apparatus for determining at least part of an eye of a serial data signal that includes a plurality of successive repetitions of a multi-bit data pattern may include comparator circuitry for producing an output signal indicative of whether voltage of the serial data signal is above or below a controllably variable reference signal voltage when the comparator circuitry is clocked by a clock signal having a controllably variable phase. The apparatus may additionally include control circuitry for controlling the reference signal voltage and the clock signal phase. The control circuitry may control the clock signal phase to establish an eye slice location. The control circuitry may further control the reference signal voltage so that it first has a base line value (e.g., 0 volts), to which the comparator circuitry compares the serial data signal voltage at the eye slice location in each bit in the data pattern to produce a reference value of the output signal for each bit. Thereafter, the control circuitry may cause the reference signal voltage to gradually increase while the comparator circuitry continues to compare the serial data signal voltage to the reference signal voltage at the eye slice location in each bit in the data pattern until the output signal for some bit becomes different than the reference value for that bit.

In accordance with a further possible aspect of the invention, after the above-mentioned control circuitry has caused the reference signal voltage to gradually increase, it may cause that voltage to gradually decrease. The comparator circuitry continues to operate as summarized above, but with the reference signal gradually decreasing until for some bit the output signal again becomes different than the reference value for that bit.

The above-mentioned output signal differences can be used to signal that the increasing (or decreasing) reference signal voltage has reached the upper (or lower) value for the eye at the eye slice location.

The apparatus can operate to repeat any or all of the above-summarized operations at a plurality of different eye slice locations.

If desired, the circuitry of this invention may all be included as part of the circuitry on the integrated circuit (chip) handling the serial data signal of which it is desired to determine or monitor the eye. The invention may therefore be used to provide on-chip eye monitoring circuitry and/or methods.

Further features of the invention, its nature and various advantages, will be more apparent from the accompanying drawings and the following detailed description.

DETAILED DESCRIPTION

Figure 1:
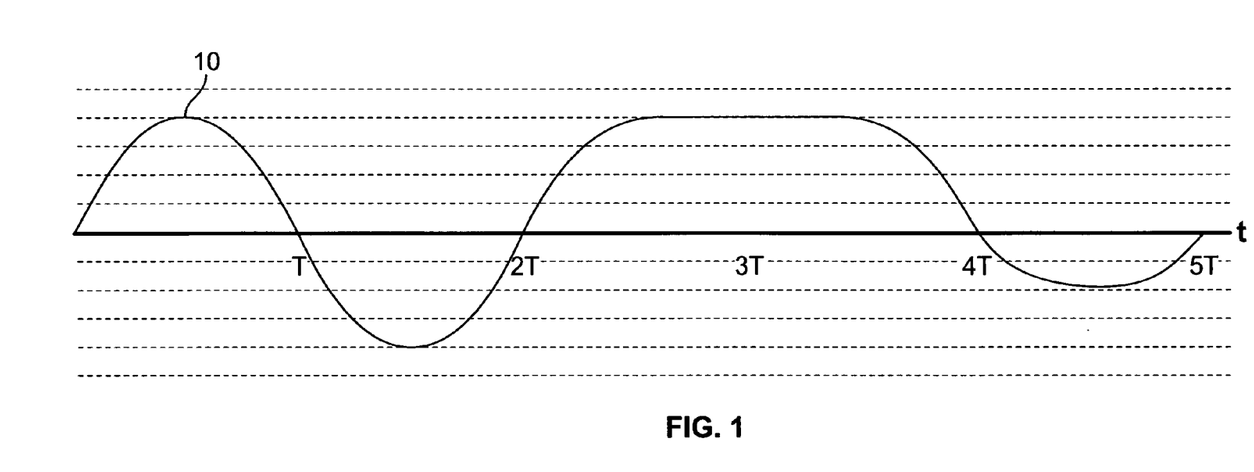
FIG. 1 is a simplified illustrative data signal waveform that is useful in explaining certain aspects of the invention.

FIG. 1 shows an illustrative data signal 10 for which an eye diagram may be desired. Each successive data bit or symbol in signal 10 occupies one respective unit interval ("UI") in that signal. The time duration of each UI is T.

Data signal 10 is shown as having positive and negative voltage excursions from a base line voltage (at the heavy horizontal line in FIG. 1), which is assumed for purposes of illustration in this example to have a value of 0.0V. Data signal 10 may represent binary 1 in UIs in which it has voltage above 0.0V, and it may represent binary 0 in UIs in which its voltage is below 0.0V. (This binary value interpretation is only an example, and it can be reversed (positive voltage means binary 0; negative voltage means binary 1) if desired.)

Figure 2:
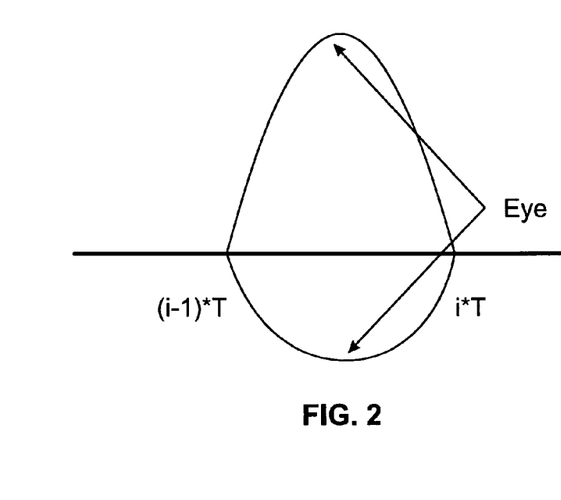
FIG. 2 is a simplified illustrative data signal eye diagram that is useful in explaining certain aspects of the invention.

FIG. 1 illustrates various types of non-uniformities that may occur in signal 10 in different UIs, depending, for example, on the value that the signal had in one or more preceding UIs. Perhaps the most striking of these non-uniformities is the difference between the second data bit (between times T and 2T) and the fifth data bit (between times 4T and 5T). Because the second bit is immediately preceded by only one positive-going bit, the circuitry handling signal 10 is able to drive the second, negative-going bit to relatively large negative voltage values. In contrast, the fifth bit is immediately preceded by two successive positive-going bits. This can make it harder for the circuitry handling signal 10 to fully respond to the fifth bit, which is negative-going. In particular, the circuitry is shown as not being able to drive signal 10 to the same relatively large negative voltage values during the fifth UI that it was able to drive the signal to during the second UI. The effective eye of signal 10 is therefore limited (on the negative side) by the less negative values during the fifth UI (see FIG. 2, which is a diagram of the eye of illustrative signal 10). Although the vertical scale of FIG. 2 is somewhat different from FIG. 1, FIG. 2 clearly shows that the negative-going side of the eye is less far from the base line voltage (again at the heavy horizontal line in FIG. 2) than the positive-going side of the eye. Again, this is the result of the fifth bit in FIG. 1 constraining the eye on the negative side. FIGS. 1 and 2 thus illustrate the point that the eye of a signal (FIG. 2) is constrained by the portions of the signal (FIG. 1) that have the smallest excursion from the base line voltage at any given time during any UI of the signal.

Figure 3:
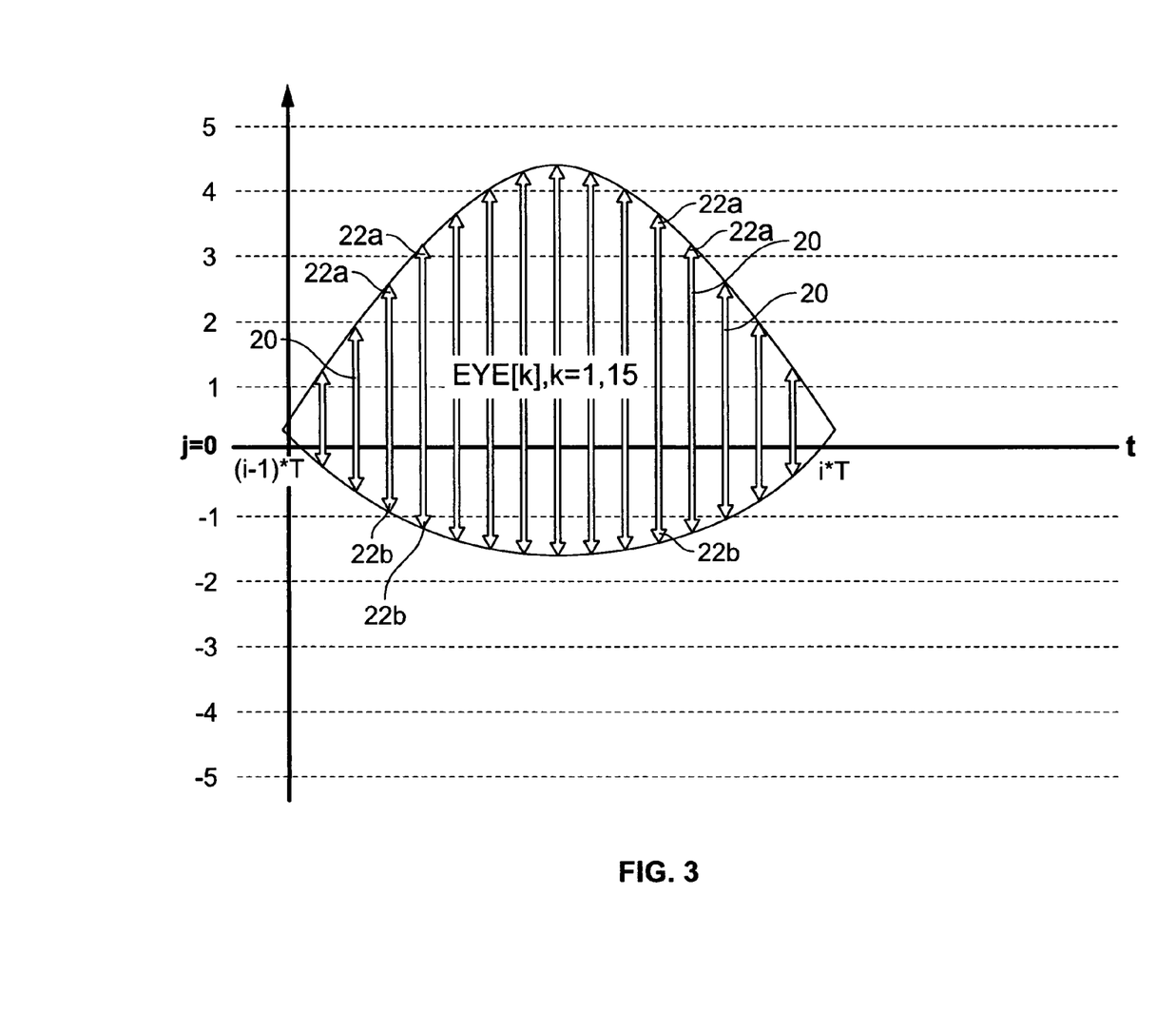
FIG. 3 is another form of what is shown in FIG. 2.

Whereas FIG. 2 shows a continuous eye diagram, FIG. 3 shows that an eye diagram can alternatively be made up of several discrete slices 20 of the eye at times that are spaced throughout the eye. Each of these slices has an upper limit value 22a and a lower limit value 22b. A trace of the upper limits 22a approximates the upper side of the eye. A trace of the lower limits 22b approximates the lower side of the eye. This invention analyzes a signal (like 10 in FIG. 1) to determine where these various eye-slice upper and lower limits 22 are for that particular signal. The resulting upper and lower eye-slice values can be displayed or otherwise output to enable a user to visualize and/or otherwise assess the eye of the signal (e.g., like 10) being processed or otherwise handled by circuitry of interest to the user.

Figure 4:
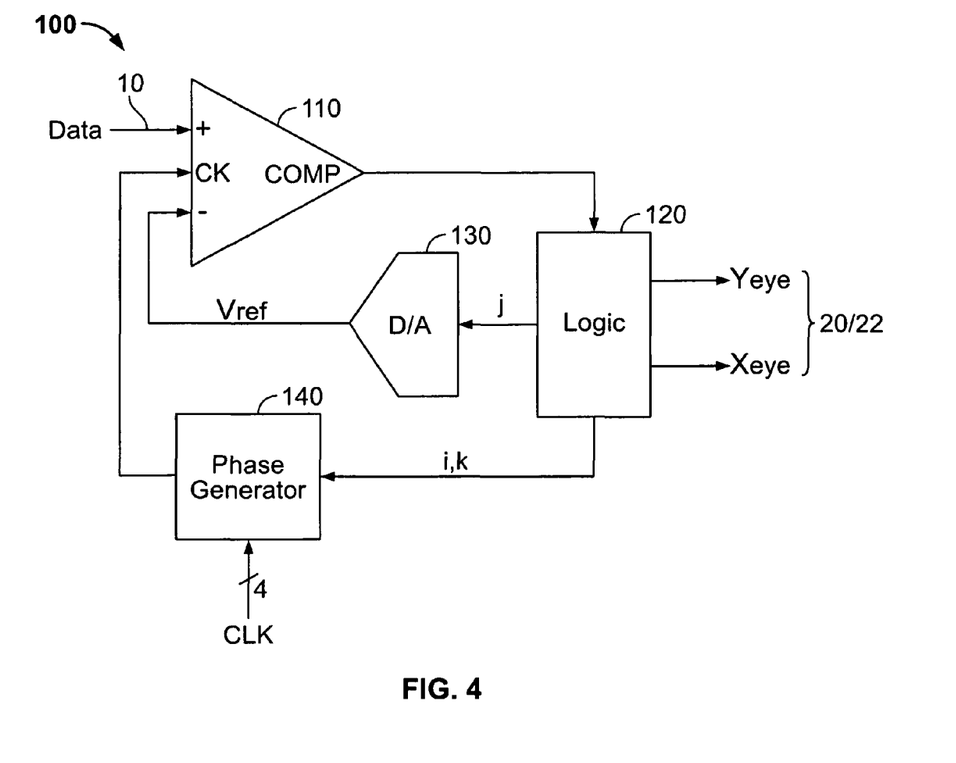
FIG. 4 is a simplified block diagram of an illustrative embodiment of circuitry in accordance with the invention.

FIG. 4 shows an illustrative embodiment of circuitry 100 that can be used for eye determination of the type described above in accordance with the invention. Circuitry 100 includes comparator circuit 110, logic or control circuitry 120, digital-to-analog ("D/A") converter circuitry 130, and phase or pulse generator circuitry 140. The signal 10 to be analyzed is applied to the "plus" input terminal of comparator 110. When comparator 110 is clocked by a clock signal from phase generator 140, comparator 110 produces an output signal indicative of how the voltage of signal 10 then compares to the voltage of a reference signal (Vref) applied to the "minus" input terminal of the comparator by D/A converter circuitry 130. The output signal of comparator 110 is applied to logic circuitry 120. Logic circuitry 120 produces output signals j that control how D/A converter 130 steps its output signal Vref through a succession of different voltage values. Logic circuitry 120 also produces output signals i and k that cause phase generator 140 to step through a succession of different output clock signal phase values. Logic circuitry 120 still further produces output signals Yeye and Xeye that enable the user to examine the eye of signal 10. For example, the Yeye signal may include values indicative of the endpoints 22a and 22b of the eye slices 20 in FIG. 3; the Xeye signal may include values indicative of the horizontal axis positions of the various eye slices 20 in FIG. 3.

Before going further, it is noted that the FIG. 4 circuitry operates on repetitions of a data pattern. For example, if the data pattern of FIG. 1 was the data pattern of interest, that pattern would be repeated many times for operation of the FIG. 4 circuitry. The data pattern can be of any desired length (number of bits), and can be made up of bits having any desired binary value sequence.

Figure 5:
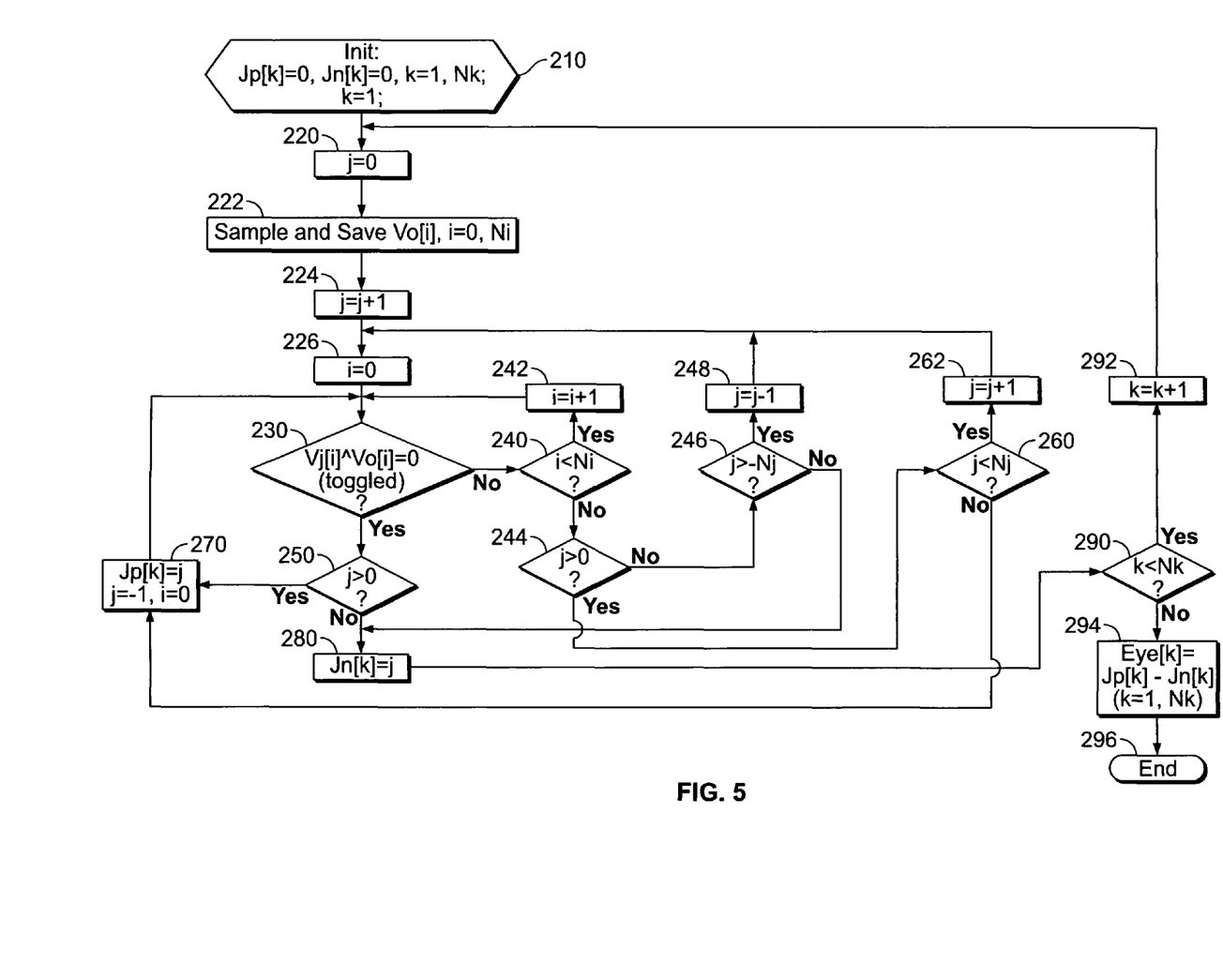
FIG. 5 is a simplified flow chart of an illustrative embodiment of eye monitoring methods in accordance with the invention.

FIG. 5 is a flow chart showing how the FIG. 4 circuitry may operate to gather information regarding the eye of signal 10 in accordance with the invention. The flow in FIG. 5 is performed, for the most part, by logic 120 in FIG. 4. All of the "samples" referred to in FIG. 5 and the following discussion are taken by comparator 110 in FIG. 4.

Step 210 is an initialization step in which all values of Jp and Jn are set to zero. There is one value of Jp and one value of Jn for each of Nk eye slices 20 (as in FIG. 3, in which example Nk is 15). Ultimately, after analysis of signal 10 has been completed, Jp[k] is the number of reference signal voltage increments above base line (e.g., 0 volts) that the eye of signal 10 is found to have at the location of the kth eye slice 20. Similarly, Jn[k] is the number of reference signal voltage increments (or decrements) below base line (e.g., 0 volts) that the eye of signal 10 is found to have at the location of the kth eye slice 20. After Jp and Jn have been initialized to 0 for all values of k from 1 to Nk, k is again set to 1, and control passes from step 210 to step 220.

In step 220 the index parameter j is set to 0. Whereas index parameter k is the index for the various eye slices 20, index parameter j is the index for controlling the voltage of Vref in FIG. 4. Parameter j can have values ranging from Nj to −Nj. In step 220 j is initialized to 0.

In step 222 the FIG. 4 circuitry is operated to sample and save V0[i] for all values of i from 0 to Ni. From the preceding steps it will be apparent that step 222 is first performed (as now being described) with k=1 (i.e., sampling at the location of the first eye slice 20) and with j=0 (i.e., with Vref in FIG. 4 at a base line value (e.g., 0 volts)). Index parameter i is the index for the number of the bit position in the data pattern currently being sampled. Assuming that the number of bits in the data pattern is Ni−1, i ranges from 0 to Ni. In a preferred embodiment, to help prevent having to operate the FIG. 4 circuitry 100 with clock signals having frequencies significantly higher than the data rate of signal 10, circuitry 100 is set up to take only one sample of data signal 10 during each repetition of the data pattern. Because k is 1 when step 222 is first performed, phase generator 140 in FIG. 4 is controlled by that value of k to output a clock signal whose phase corresponds to the location of the first eye slice 20 (see again FIG. 3). In addition, because j is 0 whenever step 222 is performed, D/A converter 130 is controlled by that value of j to output Vref=0. The first sample taken during this performance of step 222 is therefore a sample taken of the first bit in the data pattern at the location of the first eye slice 20 and with Vref=0. This is done during a first occurrence of the data pattern. In the case of the data pattern shown in FIG. 1 the resulting sample V0[0] may be binary 1 (because signal 10 is above 0 volts at the location of the first eye slice 20 in the first bit in the pattern). Index i is then increased from 0 to 1, and the next sample is taken (during the second occurrence of the data pattern) at the location of the first eye slice 20 in the second bit in the pattern, again with Vref=0. Again assuming the data pattern shown in FIG. 1, the resulting sample V0[1] may be binary 0 (because signal 10 is below 0 volts at the location of the first eye slice 20 in the second bit in the pattern). This process continues until a V0 sample has been taken for each bit in the data pattern. (The V0 samples may sometimes be referred to as reference values.)

It will be apparent from the above discussion of step 222 why phase generator 140 in FIG. 4 needs both inputs i and k. Input k tells phase generator 140 how much to shift the phase of its output clock pulse relative to phase of a basic clock signal associated with data signal 10. For example, phase generator 140 may receive four "candidate" versions of such a basic clock signal, each of the candidate versions having a different phase relationship to the basic clock signal (e.g., these four phases may equally divide one period of the basic clock signal). Phase generator 140 may then use the value of k to select an appropriate one of these candidate clock signals or to interpolate between two phase-adjacent ones of these candidate clock signals. In addition, however, phase generator 140 needs input i to determine which cycle of the clock signal it has generated it should output as a pulse in order to sample the particular bit in the data pattern that it is currently desired to sample.

After step 222 has been performed as described above, control passes to step 224, in which j is increased to 1, and then to step 226, in which i is set to 0. Control then passes to step 230.

In step 230 a sample Vj[i] of signal 10 is taken. On this first pass through step 230, this is a sample taken of the first bit in the data pattern (because i=0) at the first eye slice 20 (because k is still 1) with Vref equal to the first positive voltage increment above 0 volts (because j=1). As in step 222 the sampling result (on the lead from comparator 110 to logic 120 in FIG. 4) will be binary 1 if the serial data signal voltage is above Vref when the sample is taken, and it will be binary 0 if the data signal voltage is below Vref when the sample is taken. Also in step 230 this sample Vj[i] is compared to the earlier sample (or reference value) V0[i] taken at the same location in the data pattern with Vref=0. If these two samples have the same binary value, then the step 230 test (Vj[i] AND V0[i]= 0?) will not be satisfied, and control will pass from step 230 to step 240. On the other hand, if the two samples in step 230 have different binary values, then the step 230 test will be satisfied and control passes from step 230 to step 250. We will consider the branch to step 240 first, and later come back to the other branch to step 250.

Step 240 tests whether i is less than Ni. If so, there are more data bits to be sampled with the current values of the other index parameters. Control therefore passes to step 242 in which i is increased by 1 so that the next data bit can be sampled. From step 242, control passes back to step 230.

If step 240 produces a negative result, all data bits have been sampled at the current values of the other parameters, and so control passes from step 240 to step 244. Step 244 determines whether j is positive. If so, control passes to step 260, where j is compared to a maximum positive value Nj. If j has not yet reached the maximum positive value, control passes to step 262, where the value of j is increased by 1. Control then passes to step 226, where i is reset to 0, after which control returns to step 230.

Returning to the branch from step 230 to step 250, the very first time that this branch is taken, the system has found the bit with the lowest positive voltage at the location of the first eye slice 20. When that occurs, it is not necessary to do any more sampling of the data signal with k=1 and j positive. The positive end-point 22a of the first eye slice 20 has been found and merely needs to be saved. This is done via the branch from step 250 to step 270. Step 250 determines whether or not j is currently positive, and if so, passes control to step 270. In step 270 the current value of j is stored as result Jp[k]. Jp[k] is thus a measure of the upper limit 22a of the first eye slice 20 because it tells how many voltage increments or steps above 0 volts that upper limit is. Having now determined where the upper limit 22a of the first eye slice is, the system can next turn to determining where the lower limit 22b of that slice is. This is done by setting j to −1 and i to 0 and passing control back to step 230.

When control re-enters step 230 from step 270 for the first time, k is still 1 (for the first eye slice 20), i is 0 (for the first bit in the data pattern), and j is −1 (for the first voltage increment below 0 volts). Thus the first bit in the data pattern is sampled (by comparator 110) at the location of the first eye slice 20 (bit and phase location implemented by phase generator 140 based on inputs i and k) and with Vref equal to one voltage increment below 0 volts (Vref implemented by D/A converter based on input j). The resulting sample Vj[i] is again compared to V0[i] from step 222 with i the same in both expressions. If both of these samples have the same binary value, control passes from step 230 to step 240. (Again, the alternate possibility from step 230 to step 250 will be discussed later.)

If step 240 determines that there are more bits in the data pattern to be sampled at this value of j, control passes from step 240 to step 242 and then back to step 230 where that step is repeated for the next data bit. On the other hand, if step 240 determines that all data bits have been sampled at the current value of j, step 240 passes control to step 244, where j is compared to 0.

If step 244 determines that j is negative, control passes from step 244 to step 246. In step 246 the current value of j is compared to the maximum negative value −Nj that j can have. If step 246 determines that j has not yet reached −Nj, control passes from step 246 to step 248 where j is decreased by one more unit step. Control then passes to step 226 where i is reset to 0. From step 226, control returns to step 230 where sampling of the data bits begins again with the new value of j.

Returning to the branch from step 230 to step 250, the first time this branch is taken with k=1 and j negative, the system has found the approximate negative (lower) end 22b of the first eye slice 20. This is the result of the first occurrence (with k=1 and j negative) of a data signal bit sample Vj[i] that is negative (as indicated by the (0) binary value of V0[i] for the same value of i, but not as negative as the current value of Vref (based on the current negative value of j). This establishes the lower limit 22b of the eye slice 20 at this eye slice location, and it is not necessary to take any more samples of data signal 10 at this eye slice location (the upper limit 22a of this eye slice having been previously established as described earlier). Control passes from step 250 to step 280 to store the current negative value of j as Jn[k]. Jn[k] is a measure of the lower limit 22b of this eye slice 20 because it tells how many voltage increments (i.e., −j increments) this lower limit is below 0 volts.

From step 280 control passes to step 290, where k is compared to Nk (the number of eye slices that is desired to take). If step 290 determines that k is less than Nk, control passes to step 292 where k is increased by 1. Control then passes back to step 220 for a repetition of everything described above (except step 210) for the next eye slice. On the other hand, if step 290 determines that all eye slices have now been considered, control passes from that step to step 294 where the collected eye data can be output in the form EYE[k]=Jp[k]−Jn[k] for all values of k from 1 to Nk. Each value of EYE[k] is the height of the eye of signal 10 at the location of that eye slice 20. As an alternative to outputting EYE(k), Jp(k) and Jn(k) could be output as the data for the eye. Or the eye data could be output in any other desired way or format.

The process ends at step 296.

There are two paths in FIG. 5 that have not yet been described. One of these is the path from step 260 to step 270. This path is taken if a positive value of j reaches Nj (the maximum positive value of j) for any value of k before step 270 is reached from step 250. This means that the upper end 22a of the relevant eye slice 20 is at or above Nj voltage increments above 0 volts. This ends the search for the upper end of this eye slice. Step 270 is therefore performed to cause Jp for this eye slice to be recorded as j=Nj.

The other path in FIG. 5 that has not yet been discussed is the path from step 246 to step 280. This is analogous to the path described in the immediately preceding paragraph, but for reaching the greatest allowed negative value of j (i.e., −Nj) without previously getting to step 280 from step 250. If step 280 is reached from step 246, Jn[k] is recorded as equal to −Nj.

The foregoing shows how the invention determines eye data, like values 22a and 22b in FIG. 3, for a serial data signal 10. Control logic 120 can be set up to do this for repeating, multi-bit data patterns of any desired length (number of bits) in signal 10. In addition, control logic 120 can be set up to do this for any number of eye slices 20 and for any number of reference voltage increments Nj and −Nj. For example, control logic 120 may be implemented in field-programmable logic circuitry (like that of a programmable logic device ("PLD"), field-programmable gate array ("FPGA") integrated circuit device, programmable microcontroller, or the like), and may therefore be programmable with respect to what values of Ni, Nj, −Nj, and Nk it implements.

Figure 6:
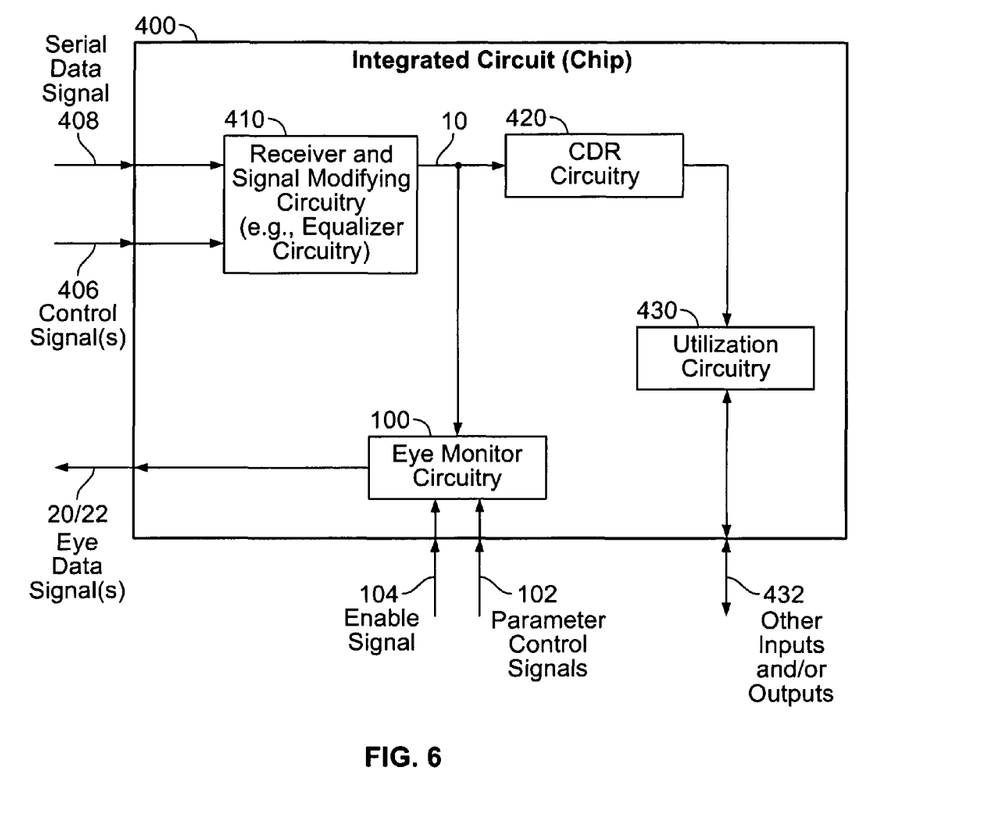
FIG. 6 is a simplified block diagram of an illustrative embodiment of an integrated circuit device that can include circuitry in accordance with the invention.

FIG. 6 illustrates the point that the invention can be implemented on the chip containing one or more nodes (e.g., internal nodes) at which it is desired to observe the eye of a serial data signal. In FIG. 6 chip 400 (which can be any of a wide range of devices such as a programmable logic device, a programmable microcontroller, etc.) includes receiver circuitry 410, clock and data recovery ("CDR") circuitry 420, utilization circuitry 430, and eye monitor circuitry 100 (e.g., as in FIG. 4). In FIG. 6 receiver circuitry 10 is shown as both receiving a serial data signal 408 from an external source and modifying that signal in at least some respect to produce a replica (at least somewhat modified) of the input signal. For example, the above-mentioned modification may be performing some equalization on the input signal. The kind(s) and/or amount(s) of this equalization (or other modification) may be controllable (e.g., programmable/reprogrammable) by control signals 406 (some or all of which can be applied from sources external to chip 400). The replica signal produced by circuitry 410 is the serial data signal 10 applied to CDR circuitry 420 and eye monitor circuitry 100. Utilization circuitry 430 makes use of the data recovered from signal 10 by CDR circuitry 400. Circuitry 430 may also have other inputs and outputs, including inputs and outputs 432 that are external to chip 400.

FIG. 6 also shows that circuitry 100 on chip 400 may be controllable (e.g., programmable/reprogrammable) by control signals 102 (some or all of which can be applied from sources external to chip 400). For example, such control may set values for parameters such as Ni, Nj, −Nj, and Nk.

FIG. 6 also shows that circuitry 100 may be enabled to operate by asserting an enable signal 104 (typically applied to chip 400 from an external source when it is desired to collect eye diagram data). And FIG. 6 shows that circuitry 100 outputs from chip 400 eye data 20/22 it has collected.

Figure 7:
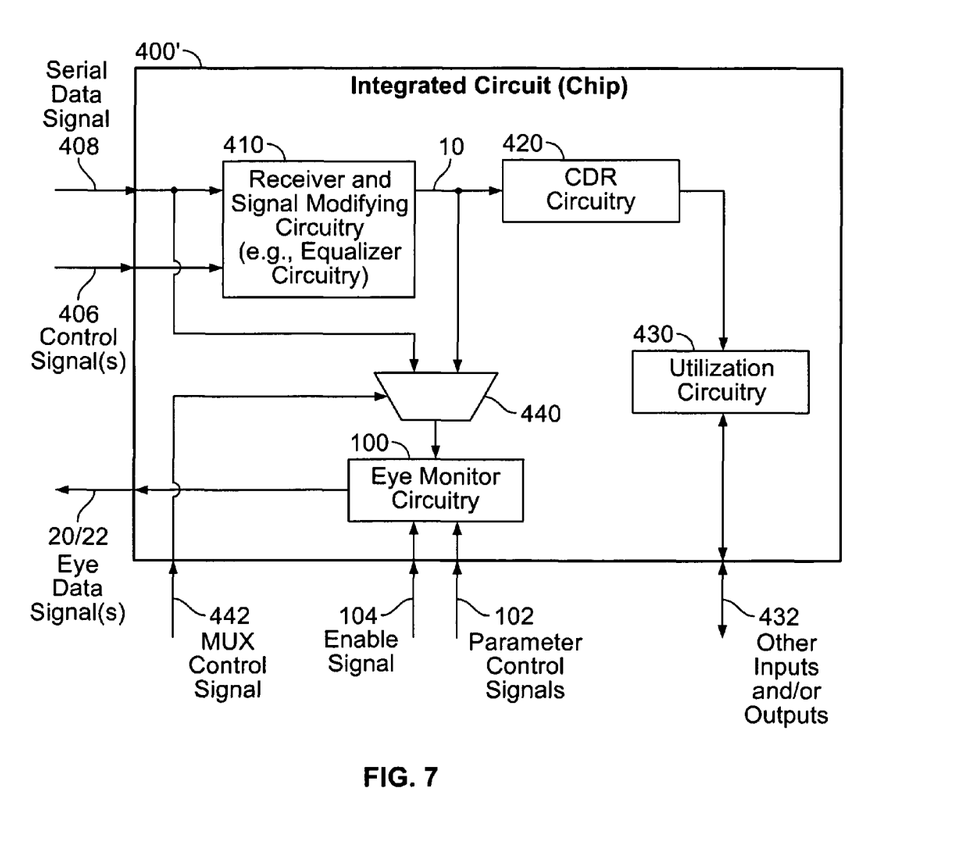
FIG. 7 is similar to FIG. 6 for another illustrative embodiment in accordance with the invention.

FIG. 7 shows a modified form of chip 400 (now identified by the reference number 400' on account of the differences discussed below). In chip 400' a multiplexer 440 allows eye monitor circuitry 100 to operate on a serial data signal from either of two locations on the chip. In the particular example shown in FIG. 7, one selectable input to multiplexer 440 comes from at or near the chip input for serial data signal 408, while the other selectable input comes from lead 10. Multiplexer 440 is controlled by chip input signal 442 to apply either of its selectable input signals to eye monitor circuitry 100. Thus in this example, circuitry 100 can be used to monitor the eye of the serial data signal either before or after circuitry 410, and if it is desired to examine the serial data signal at both of those locations, that can be done for each location in turn.

From the foregoing, it will be seen that the invention uses a low-frequency clock to sample a repetitive data pattern and reconstruct the eye diagram. The architecture is simple and includes a differential comparator 110, a D/A converter 130, a pulse generator 140, and control logic 120. The invention facilitates display of an eye diagram of internal nodes of a chip without an oscilloscope and probes. The invention can provide feedback information for use in adjusting RX equalization (e.g., in circuitry 410 in FIG. 6 or FIG. 7). The invention can be used to enable or at least facilitate in-field system-level diagnosis and debugging of HSSI devices. The invention employs a relatively simple structure. It can have programmable horizontal and vertical resolution (number of increments of k and j, respectively). It can work with data patterns of programmable length (number of increments of i). The invention makes use of relatively low sampling rates and provides digital outputs 20/22. The invention has relatively low power consumption.

It will be understood that the foregoing is only illustrative of the principles of the invention, and that various modifications can be made by those skilled in the art without departing from the scope and spirit of the invention. For example, although in the above-described illustrative embodiment the reference signal voltage Vref is first gradually increased from 0 volts to find upper eye slice values 22a, and then later gradually decreased from 0 volts to find lower eye slice values 22b, it will be understood that this order of operations can be reversed if desired. Various data rates, signal frequencies, and voltage levels that are specifically mentioned above are only examples, and it will be understood that other data rates, signal frequencies, and voltage levels can be used instead if desired. As a specific illustration of this, the use of 0 volts as a base line reference signal voltage is only an example, and if the serial data signal being analyzed has a voltage offset, then use of a different base line reference signal voltage may be appropriate. Other parameters can also be varied as desired. Example of such variable parameters include the number of bits in the data pattern, the number of eye slice locations 20, the number of reference voltage increments Nj and −Nj, and how (i.e., in what form) the data collected for the eye is output. As still another example of possible modifications within the scope of the invention, FIG. 1 shows serial data signal 10 as a single-ended signal (i.e., not a differential signal). This same assumption has been made for all signals shown and described throughout this specification. It will be understood, however, that the serial data signal can instead be a differential signal pair, and that appropriate modifications can be made in a straight-forward way to handle such a differential signal.

The invention claimed is:

1. A method of determining at least part of an eye of a serial data signal that includes a plurality of successive repetitions of a multi-bit data pattern comprising: controlling phase of a clock signal to establish an eye slice location for use as a location at which voltage of each bit in the data pattern can be compared to a controllably variable reference signal voltage; causing the reference signal to have a base line voltage; comparing the voltage of the serial data signal to the base line reference signal voltage at the eye slice location in each bit in the data pattern to produce a reference value for each of the bits; and gradually increasing the reference signal voltage and for each such increase, again comparing the voltage of the serial data signal to the reference signal voltage at the eye slice location in each bit in the data pattern until for some bit a result of the again comparing is different than the reference value for that bit; and storing as an upper value of the eye at the eye slice location information indicative of the reference signal voltage when the result of the again comparing was different than the reference value for that bit.

2. The method defined in claim 1 further comprising:
using an indication of the reference signal voltage when the result different than the reference value occurred as an indication of an upper value of the eye at the eye slice location.

3. The method defined in claim 2 further comprising:
after conclusion of the gradually increasing, gradually decreasing the reference signal voltage, and for each such decrease, yet again comparing the voltage of the serial data signal to the reference signal voltage at the eye slice location in each bit in the data pattern until for some bit a further result of the yet again comparing is different than the reference value for that bit.

4. The method defined in claim 3 further comprising:
using an indication of the reference signal voltage when the further result different than the reference value occurred as an indication of a lower value of the eye at the eye slice location.

5. The method defined in claim 1 further comprising:
further controlling the phase of the clock signal to establish a plurality of different eye slice locations; and
for each of the eye slice locations in succession, repeating the causing, comparing, and gradually increasing.

6. The method defined in claim 1 wherein the plurality of eye slice locations collectively subdivides a time duration of any bit in the serial data signal into a plurality of substantially equal amounts of time.

7. The method defined in claim 1 wherein the comparing is performed only once during any given repetition of the data pattern.

8. The method defined in claim 1 wherein the again comparing is performed only once during any given repetition of the data pattern.

9. Apparatus for determining at least part of an eye of a serial data signal that includes a plurality of successive repetitions of a multi-bit data pattern comprising: comparator circuitry for producing an output signal indicative of whether voltage of the serial data signal is above or below a controllably variable reference signal voltage when the comparator circuitry is clocked by a clock signal having a controllably variable phase; and control circuitry for: controlling the reference signal voltage and the clock signal phase, the clock signal phase being controlled to establish an eye slice location, and the reference signal voltage being controlled so that it first has a base line value to which the comparator circuitry compares the serial data signal voltage at the eye slice location in each bit in the data pattern to produce a reference value of the output signal for each bit, the reference signal voltage being thereafter further controlled to gradually increase while the comparator circuitry continues to compare the serial data signal voltage to the reference signal voltage at the eye slice location in each bit in the data pattern until the output signal for some bit becomes different than the reference value for that bit, and storing as an indication of an upper value of the eye at the eye slice location information indicative of the reference signal voltage when the output signal becomes different than the reference value for that bit.

10. The apparatus defined in claim 9 wherein, after the reference signal voltage has been further controlled, the control circuitry still further controls the reference signal voltage so that it gradually decreases while the comparator circuitry continues to compare the serial data signal voltage at the eye slice location in each bit in the data pattern until the output signal for some bit again becomes different than the reference value for that bit.

11. The apparatus defined in claim 10 wherein the control circuitry further stores information indicative of the reference signal voltage when the output signal again became different than the reference value for a bit as an indication of a lower value of the eye at the eye slice location.

12. The apparatus defined in claim 9 wherein the control circuitry controls the reference signal voltage and the clock signal phase so that the apparatus operates in a substantially similar way at each of a plurality of different eye slice locations, one after another, in succession.

13. The apparatus defined in claim 9 wherein the control circuitry controls the clock signal phase so that the comparator circuitry performs only one comparison during each repetition of the data pattern.

14. The apparatus defined in claim 9 wherein the control circuitry controls the reference signal voltage so that it increases by a predetermined increment only after the comparator circuitry has operated on all bits in the data pattern.

15. The apparatus defined in claim 9 wherein the control circuitry controls the clock signal phase to divide a time period occupied by any one bit in the data signal into a plurality of equally spaced eye slice locations.

16. An integrated circuit device comprising apparatus as defined in claim 9.

17. The integrated circuit device defined in claim 16 further comprising:
   circuitry for receiving a received serial data signal from an external source and for producing a replica of the received serial data signal that is modified in at least some respect relative to the received serial data signal; and
   circuitry for applying the replica to the comparator circuitry as the serial data signal.

18. The integrated circuit device defined in claim 17 wherein the circuitry for receiving comprises:
   equalizer circuitry for performing an equalization operation on the received serial data signal to produce the replica.

19. A method of determining an eye of a serial data signal that includes a plurality of successive repetitions of a multi-bit data pattern comprising:
   sub-dividing a unit interval of the data signal into a plurality of eye slice locations, and then for each eye slice location doing the following:
   comparing voltage of the data signal at the eye slice location in each bit in the data pattern to a base line reference voltage to produce a reference value for each bit, the reference value being indicative of whether the voltage of the data signal is above or below the base line reference voltage;
   gradually increasing the reference voltage, and during the increasing, again comparing voltage of the data signal at the eye slice location in each bit in the data pattern to the reference voltage until for some bit a result of the again comparing is different than the reference value for that bit;
   storing as an upper value of the eye at the eye slice location information indicative of the reference voltage when the preceding step detected that the result of the again comparing was different than the reference value for a bit;
   gradually decreasing the reference voltage, and during the decreasing, further comparing voltage of the data signal at the eye slice location in each bit in the data pattern to the reference voltage until for some bit the result of the further comparing is different than the reference value for that bit; and
   storing as a lower value of the eye at the eye slice location information indicative of the reference voltage when the preceding step detected that the result of the further comparing was different than the reference value.

* * * * *